Figure 1:
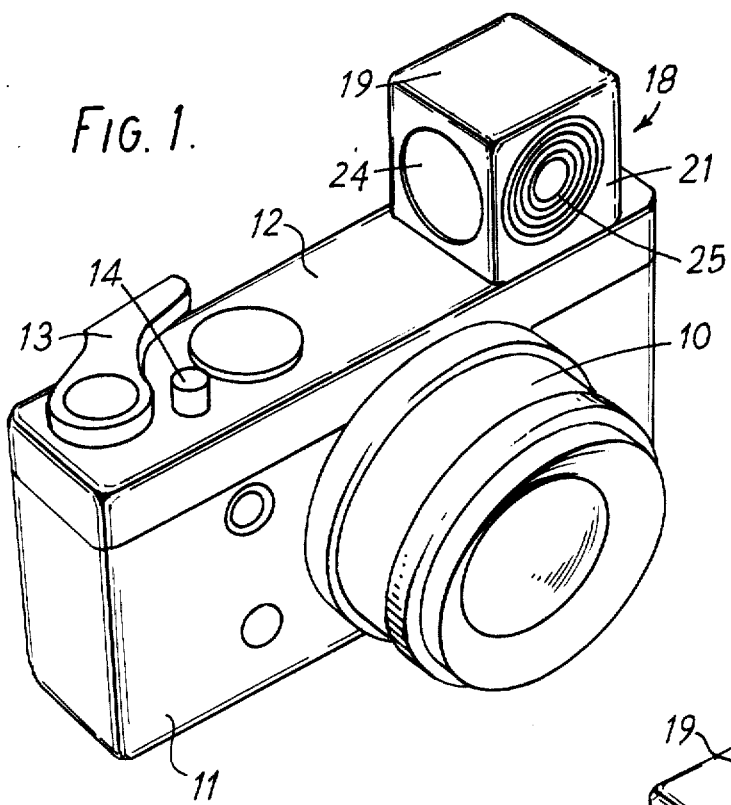

United States Patent

Kingston

[11] 3,878,385
[45] Apr. 15, 1975

[54] ACCESSORY FOR FLASH PHOTOGRAPHY

[76] Inventor: Arthur William Kingston, The Old Mill House, Willowbank, Denham, England

[22] Filed: June 4, 1973

[21] Appl. No.: 366,416

[30] Foreign Application Priority Data
June 6, 1972 United Kingdom............ 026421/72

[52] U.S. Cl. ................ 240/1.3; 350/314; 354/126
[51] Int. Cl. ............................................. G03b 15/02
[58] Field of Search ............ 240/1.3; 95/11 R, 11 L, 95/11.5; 350/314, 318

[56] References Cited
UNITED STATES PATENTS

| | | | |
|---|---|---|---|
| 2,811,907 | 11/1957 | Hyzer | 240/1.3 X |
| 2,879,377 | 3/1959 | Layng | 240/1.3 |
| 3,109,595 | 11/1963 | Bohme | 240/1.3 |
| 3,386,360 | 6/1968 | Nerwin | 240/1.3 X |
| 3,456,101 | 7/1969 | Rentschler et al. | 240/1.3 |
| 3,763,366 | 10/1973 | Bahnsen | 240/1.3 |
| R27,468 | 9/1972 | Land | 240/1.3 X |

*Primary Examiner*—Richard L. Moses
*Attorney, Agent, or Firm*—Woodhams, Blanchard and Flynn

[57] ABSTRACT

An accessory for use with a photographic flash cube or flash bar to vary the intensity of illumination, has on one face a lens to concentrate the light and on another face a grid or diffuser to reduce the illumination. The accessory is constructed to fit over the flash cube or bar in different positions in accordance with the illumination required.

5 Claims, 4 Drawing Figures

ACCESSORY FOR FLASH PHOTOGRAPHY

The present invention relates to an accessory for flash photography to be used in conjunction with a flash cube or flash bar.

Flash cubes are widely available and consist of four flash bulbs with individual reflectors forming flash units which are arranged on four sides of a cubical structure which can be fitted on the camera. The flash cube is rotatable to bring each flash unit in turn into the front position in which it is ignited electrically or by percussion upon the operation of the camera shutter. The flash bar is a similar device which has a row of flash units along one side which can be used in turn and a second row along the opposite side which can be used in turn after the bar has been reversed.

The flash cube and flash bar are commonly used with simple cameras which have only one or two exposure times. It is only in a limited range of conditions that the light output of the flash cube or bar will match the exposure time to give the correct exposure of the film. It is an object of the present invention to provide greater flexibility in the use of flash cubes and flash bars and for this purpose the invention provides an accessory which can be fitted over the flash cube or flash bar in several different positions to provide a choice of the degree of illumination provided by the flash. For control of the degree of illumination the accessory has a number of light-controlling plates which can be placed over the face of the cube or bar. One plate is formed with a lens to concentrate the light from the flash bulb and thus increase the illumination of the subject. This is particularly useful for relatively distant subjects at about 12 to 18 ft. from the camera. It would, however, give too much light for a close-up of, say, 3 ft. and for this a second plate is used which reduces the light reaching the subject by either absorbing or dispersing some of the light. The normal output of the flash bulb with its reflector may be used if the accessory has a transparent plate or an open face and if desired, a further plate giving a different degree of reduction of the light output may be provided.

For a flash cube the accessory is preferably in the form of a cubical box with one open face. This can be dropped over the flash cube in any one of four positions, each peripheral face of the accessory being constructed to give a different light output. In the case of a flash bar the accessory may be in the form of an H the four limbs of which correspond to the four faces of the cubical box, or in the form of a saddle or yoke.

Figure 2:
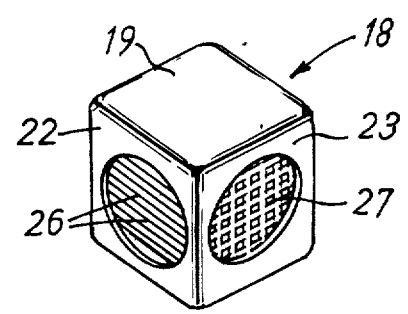
Figure 2:
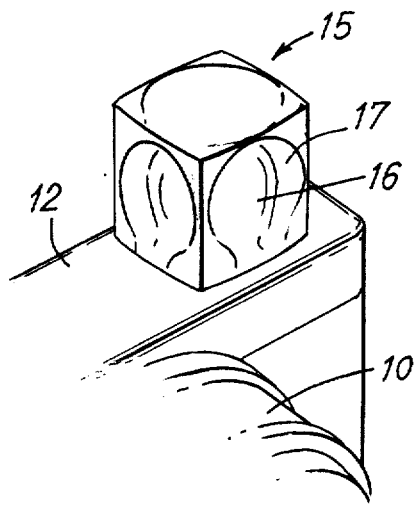
Figure 3:
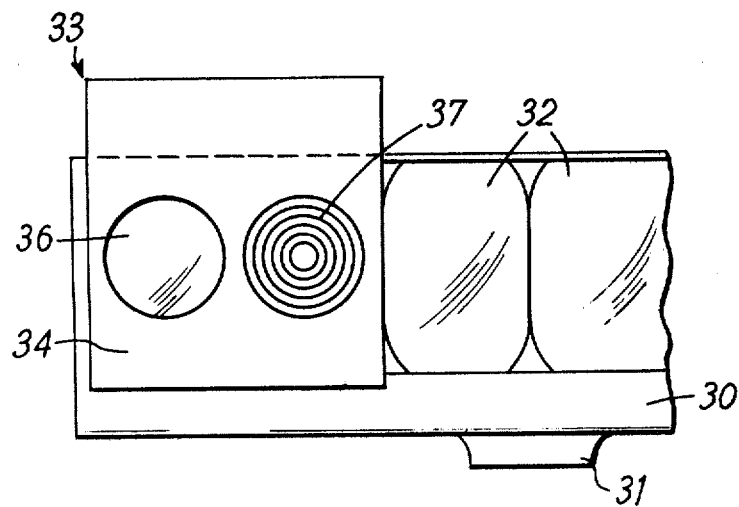
Figure 4:
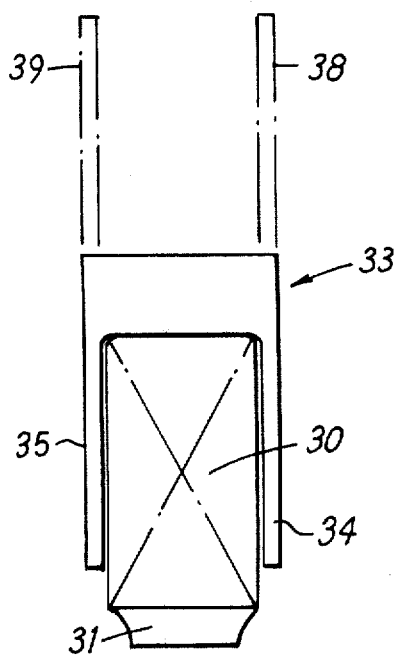

The invention will now be described in more detail with the aid of examples illustrated in the accompanying drawings, in which:

FIG. 1 is a perspective view of a camera with an accessory in accordance with the invention fitted over a flash cube thereon, FIG. 2 is an exploded view showing the accessory removed from the flash cube and rotated to a position 180° from that shown in FIG. 1, FIG. 3 shows in front elevation a flash bar with a second form of accessory in accordance with the invention mounted thereon, and FIG. 4 is an end elevation of the flash bar and accessory of FIG. 3, which also shows in broken lines a third form of accessory.

Referring first to FIGS. 1 and 2 the camera shown is of conventional type with a lens mount 10 carried on the front of a body 11 which has a top 12 on which are carried a wind-on lever 13 and a shutter release button 14. The camera is constructed to receive a flash cube 15 (FIG. 2) which fits on the top 12 of the camera. In conventional manner the flash cube 15 has on each of its four side faces a flash bulb 16 mounted within a reflector 17. In conventional manner the operation of the shutter release button 14 effects the ignition of one of the flash bulbs 16 and thereafter the flash cube is automatically rotated to present a fresh flash bulb for ignition for the next flash photograph. Further description is considered superfluous since such flash cubes and their manner of operation are well-known to large numbers of amateur photographers as well as to the photographic trade.

The accessory in accordance with the invention is indicated generally by the reference numeral 18. It is a hollow cube moulded of a synthetic plastics material, preferably transparent material, and has a top end face 19 and four side faces 20 and 21, (seen in FIG. 1) 22 and 23 (seen in FIG. 2). The bottom end face of the accessory 18 is open so that the accessory can be placed over the flash cube 15 when the latter is mounted on the camera. The internal dimensions of the accessory are chosen such that it is a close fit over the flash cube. It may be placed in position with any one of the four side faces 20 to 23 covering the front face of the flash cube.

The side face 20 of the accessory has an opening 24 through which the light from the flash cube can pass freely without attenuation or modification in any way. Substantially the same result can be achieved if the side face 20 is a continuous transparent sheet. The other three faces 21, 22 and 23 form light-controlling plates which modify in different ways the light emitted by the flash cube. The face 21 has a lens 25 of the Fresnel type which serves to concentrate the light from the flash cube and thus increase the illumination in the picture area. The face 22 has a series of parallel horizontal bars 26 which prevent the passage of light and thus reduce the illumination provided by the flash cube. In this case the face 22 has a matt diffusing surface on which the bars 26 are printed and the area covered by the bars is such as to reduce the light output to 50 percent of that through the face 20. The face 23 has a grid or grille 27 of intersecting bars which reduce the light output still further to 25 percent of that given by the face 20. Again the face 23 has a matt diffusing surface on which an opaque grid 27 is printed.

Preferably the lens 25 and the patterns 26 and 27 are formed integrally with the faces 21 to 23 of the cubical box. Instead of opaque patterns 26 and 27 it is possible to form the faces of the cube with dispersing prismatic bars or with louvres which deflect the light from the flash cube. Obviously the form of the pattern can be varied and, for example, it is possible to use on both of the faces 22 and 23 patterns of concentric rings.

FIG. 3 shows a flash bar 30 which in conventional manner has a projection 31 on its base for mounting on a camera and which has a series of flash units 32 on its front face each of which consists of a flash bulb positioned within a reflector. The rear face of the flash bar 30 has a similar series of flash units (not shown) which can be used when the flash bar has been dismounted from the camera, reversed, and re-mounted. For use with this flash bar 30, which is of conventional form, the invention provides an accessory 33 in the form of an inverted U-shaped yoke with legs 34 and 35 (FIG. 4). The accessory 33 is formed to fit closely over the flash bar 30 and may be held in position either by friction resulting from resilient gripping of the bar 30 by the limbs 34 and 35 and by clips (not shown) moulded into the accessory. One limb 34 of the yoke is provided with a transparent circular window 36 and a Fresnel lens 37 which are arranged side by side at a spacing corresponding to that of the flash units 32. The window 36 and lens 37 can thus be positioned selectively over the flash unit which is to be used and perform the same functions as the opening 24 and lens 25. The other limb 35 of the yoke similarly is provided with patterns corresponding to the patterns 26 and 27 which serve to reduce the light output from a flash unit 32 in exactly the same way. These patterns (not shown) on the limb 35 are positioned in an exactly similar manner to the window 36 and lens 37 so that by reversing the accessory 33 they can be placed selectively over the flash unit to be used.

FIG. 4 indicates in broken lines an alternative form of the accessory 33 which has additional limbs 38 and 39 giving the accessory an H shape. Each of the four limbs 34, 35, 38 and 39 is provided with a single window, lens, or other light-controlling area each of which can be placed over the flash unit 32 to be used by appropriate positioning of the H-shaped accessory.

I claim:

1. An accessory for a photographic flash cube or flash bar having a structure dimensioned to fit on said flash cube or bar in any one of a number of positions, said structure comprising a number of light-controlling plates of which a first plate is formed with a lens to concentrate the light from a flash unit, and a second plate is constructed to transmit only a proportion of the light from a flash unit, said second light-controlling plate having a light diffusing surface on which is formed a pattern of light-interrupting areas, said first and second plates being located over a flash unit of the said flash cube or bar in a first and a second of the said positions of the structure, respectively, said structure comprising a hollow cube member molded of a synthetic plastics material which is substantially transparent, said cube member having four sides and an open bottom end for close fitting placement over a flash cube with any desired one of the four sides covering the front face of the flash cube, said first plate being a first side of said cube member and having formed therein a Fresnel lens for concentrating the light from the flash cube to increase illumination of a distant photographic subject, said second plate being a second side of said cube member and incorporating a first pattern of barlike elements defining said pattern of light-interrupting areas, the third side of said cube member having a further pattern of barlike elements to transmit a lesser proportion of the light from the flash unit, the fourth side of said cube member being at least substantially transparent to permit unmodified flash cube light output therepast, whereby the cube member can remain on the flash cube for illuminating photographic subjects in the range of distances therefrom including distances greater than, less than, and equal to the normal distance for flash cube operation, subject to reorientation on the flash cube in accord with the subject distance for a given photograph, the second side having a matt diffusing surface and said barlike elements comprise a series of opaque parallel bars printed on such matt diffusing surface, the area of said second side covered by said bars being such as to reduce the light output to about 50 percent of that through said fourth side, said third face also having a matt diffusing surface, said barlike elements of said third face comprising an opaque grid of intersecting bars printed on the matt diffusing surface thereof and covering such an area of said third side as to reduce the light output therethrough to about 25 percent of that through said fourth side.

2. An accessory as claimed in claim 1 in which said lens and patterned areas of said second and third sides are formed integrally with the corresponding sides of said cube member, the fourth side of said cube member having an opening therethrough through which the light from the flash cube can pass freely without modification.

3. An accessory as claimed in claim 2 in which said lens, patterned areas and opening define similar circular and substantially central zones of the corresponding cube member sides so as to be placeable alternatively in similar relation to a given light emitting side of the flash cube.

4. An accessory for a photographic flash cube or flash bar having a structure dimensioned to fit on said flash cube or bar in any one of a number of positions, said structure comprising a number of light-controlling plates of which a first plate is formed with a lens to concentrate the light from a flash unit, and a second plate is constructed to transmit only a proportion of the light from a flash unit, said second light-controlling plate having a light diffusing surface on which is formed a pattern of light-interrupting areas, said first and second plates being located over a flash unit of the said flash cube or bar in a first and a second of the said positions of the structure, respectively, said structure comprising an inverted U-shaped yoke from the central portion of which extend a pair of spaced, parallel, substantially platelike legs unconnected except through said central portion, said yoke being sized to closely straddle a flash bar with said spaced platelike legs sandwiching any desired light emitting portion of said flash bar, including at least one flash unit, therebetween, said legs of said yoke incorporating said plates, said yoke being repositionable longitudinally of said flash bar to control light output from different portions of the flash bar, said yoke having an additional pair of substantially platelike legs extending away from and substantially coplanar with said first mentioned pair of platelike legs and also fixed to said central portion to provide a substantially H-shaped structure, each of the four legs incorporating a single and unique light control zone placeable over a given flash unit of the light bar by pivotal repositioning of the H-shaped structure about a pair of axes perpendicular to each other and to the longitudinal extent of the light bar.

5. An accessory as claimed in claim 4 in which said light control zones comprise a Fresnel lens defining said first plate, a light transmitting opening and first and second light output reducing patterns, one of which defines said second plate.

* * * * *